(12) United States Patent
Tehranipoor et al.

(10) Patent No.: US 10,573,605 B2
(45) Date of Patent: Feb. 25, 2020

(54) LAYOUT-DRIVEN METHOD TO ASSESS VULNERABILITY OF ICS TO MICROPROBING ATTACKS

(71) Applicants: University of Florida Research Foundation, Incorporated, Gainesville, FL (US); The University of Connecticut, Farmington, CT (US)

(72) Inventors: Mark M. Tehranipoor, Gainesville, FL (US); Domenic J. Forte, Gainesville, FL (US); Navid Asadizanjani, Gainesville, FL (US); Qihang Shi, Farmington, CT (US)

(73) Assignees: University of Florida Research Foundation, Incorporated, Gainesville, FL (US); The University of Connecticut, Farmington, CT (US)

( * ) Notice: Subject to any disclaimer, the term of this patent is extended or adjusted under 35 U.S.C. 154(b) by 209 days.

(21) Appl. No.: 15/838,647

(22) Filed: Dec. 12, 2017

(65) Prior Publication Data

US 2018/0166399 A1     Jun. 14, 2018

Related U.S. Application Data

(60) Provisional application No. 62/433,532, filed on Dec. 13, 2016.

(51) Int. Cl.
*G06F 21/70* (2013.01)
*H01L 23/00* (2006.01)
(Continued)

(52) U.S. Cl.
CPC .............. *H01L 23/57* (2013.01); *G06F 21/60* (2013.01); *G06F 21/70* (2013.01); *G06F 21/87* (2013.01);
(Continued)

(58) Field of Classification Search
CPC ....... H01L 23/57; H01L 23/00; H01L 23/576; G06F 21/60; G06F 21/70; G06F 21/87; G01R 31/2851
See application file for complete search history.

(56) References Cited

U.S. PATENT DOCUMENTS 5,675,499 A * 10/1997 Lee .................... G01R 31/2886
324/750.16
6,072,179 A *  6/2000 Paniccia .............. G01R 31/311
250/341.4
(Continued)

FOREIGN PATENT DOCUMENTS

WO     WO2018/010940 A1 *  1/2018   ............... G03F 1/36

OTHER PUBLICATIONS

International Roadmap Committee, "The International Technology Roadmap for Semiconductors: 2013 Edition, IRC Overview", 2013, 34 pages, retrieved from <http://www.itrs2.net/2013-itrs.html> on Sep. 21, 2018.

(Continued)

*Primary Examiner* — Joseph P Hirl
*Assistant Examiner* — Stephen T Gundry
(74) *Attorney, Agent, or Firm* — Alston & Bird LLP

(57)     ABSTRACT

A method of assessing vulnerability of Integrated Circuit (IC) can include: preparing a list of logic nets of the IC; obtaining rectangular segments from the logic nets; finding a milling exclusion area based on a covering wire; and superimposing the found milling exclusion area onto the rectangular segments of the logic nets. The milling exclusion area is an area that microprobing attack does not succeed without cutting off at least one of the rectangular segments.

19 Claims, 4 Drawing Sheets

(51) Int. Cl.
*G06F 21/60* (2013.01)
*G06F 21/87* (2013.01)
*G01R 31/28* (2006.01)

(52) U.S. Cl.
CPC ............ *H01L 23/00* (2013.01); *H01L 23/576* (2013.01); *G01R 31/2851* (2013.01)

(56) References Cited

U.S. PATENT DOCUMENTS

| | | | |
|---|---|---|---|
| 6,372,627 B1* | 4/2002 | Ring | G01R 31/2851 |
| | | | 438/18 |
| 6,414,335 B1* | 7/2002 | Goruganthu | G01R 31/307 |
| | | | 257/296 |
| 6,417,680 B1* | 7/2002 | Birdsley | G01R 31/311 |
| | | | 324/754.23 |
| 6,448,095 B1* | 9/2002 | Birdsley | G01R 31/307 |
| | | | 257/E21.525 |
| 6,798,234 B2 | 9/2004 | Laackmann et al. | |
| 6,962,294 B2 | 11/2005 | Beit-Grogger et al. | |
| 8,056,025 B1* | 11/2011 | Chowdhury | G06F 17/5045 |
| | | | 324/538 |
| 9,075,932 B1* | 7/2015 | Salowe | G06F 17/50 |
| 9,940,445 B2* | 4/2018 | Moritz | G06F 9/3846 |
| 9,946,899 B1* | 4/2018 | Wesson | G06F 1/14 |
| 10,135,239 B2* | 11/2018 | Aubry | G06K 19/07327 |
| 10,341,108 B1* | 7/2019 | Smayling | H04L 9/0861 |
| 10,395,032 B2* | 8/2019 | Keller | G01R 31/001 |
| 2012/0006122 A1* | 1/2012 | Aitken | H01L 22/12 |
| | | | 73/763 |
| 2013/0032950 A1* | 2/2013 | Ware | H01L 23/481 |
| | | | 257/774 |
| 2016/0034628 A1* | 2/2016 | Rajendran | G06F 17/5068 |
| | | | 716/103 |
| 2016/0042199 A1* | 2/2016 | Joharapurkar | G06F 21/75 |
| | | | 726/34 |
| 2016/0098561 A1* | 4/2016 | Keller | G06F 21/554 |
| | | | 726/24 |
| 2017/0083459 A1* | 3/2017 | Riou | G06F 12/1466 |
| 2017/0186706 A1* | 6/2017 | Guilley | H01L 23/576 |
| 2018/0032655 A1* | 2/2018 | Levi | G06F 17/5022 |
| 2018/0046753 A1* | 2/2018 | Shelton | G16H 80/00 |
| 2018/0102643 A1* | 4/2018 | Aubry | G06K 19/07327 |
| 2018/0181765 A1* | 6/2018 | Rietsch | G06F 21/6245 |
| 2018/0260586 A1* | 9/2018 | Fine | B81B 7/02 |

OTHER PUBLICATIONS

Tarnovsky, Christopher, "Deconstructing a 'Secure' Processor", Black Hat Briefings, Feb. 15, 2013, viewed on YouTube at <https://www.youtube.com/watch?v=w7PT0nrK2BE>.

Wu et al., "Precise nanofabrication with multiple ion beams for advanced circuit edit," Microelectronics Reliability, Sep. 2014, pp. 1779-1784, vol. 54.

Boit et al., "Security risks posed by modern IC debug and diagnosis tools," 2013 Workshop on Fault Diagnosis and Tolerance in Cryptography, Aug. 2013, pp. 3-11.

Ling et al., "Design of monitor and protect circuits against FIB attack on chip security," 2012 Eighth International Conference on Computational Intelligence and Security, Nov. 2012, pp. 530-533.

Manich et al., "Detection of probing attempts in secure ICs," 2012 IEEE International Symposium on Hardware-Oriented Security and Trust, Jun. 2012, pp. 134-139.

Ray, "FREUD applications of FIB: invasive FIB attacks and countermeasures in hardware security devices," East-Coast Focused Ion Beam User Group Meeting, Mar. 2009, pp. 1-29.

Skorobogatov, "Physical attacks on tamper resistance: progress and lessons," 2nd ARO Special Workshop on Hardware Assurance, Apr. 2011, pp. 1-37, Washington, DC.

Anderson, Security Engineering: A Guide to Building Dependable Distributed Systems, Jan. 2001, pp. 1-591, Wiley Publishing, Inc.

Fu et al., "Investigation of aspect ratio of hole drilling from micro to nanoscale via focused ion beam fine milling," Innovation in Manufacturing Systems and Technology, Jan. 2005, pp. 1-5.

Quadir et al., "A survey on chip to system reverse engineering," ACM Journal on Emerging Technologies in Computing Systems, Apr. 2016, pp. 1-34, vol. 13, No. 1.

Helfmeier et al., "Breaking and entering through the silicon," Proceedings of the ACM SIGSAC Conference on Computer and Communications Security, Nov. 2013, pp. 1-11.

Cioranesco et al., "Cryptographically secure shields," IEEE International Symposium on Hardware-Oriented Security and Trust, May 2014, pp. 1-9.

Briais et al., "Random active shield," IEEE Workshop on Fault Diagnosis and Tolerance in Cryptography, Sep. 2012, pp. 1-12.

Ishai et al., "Private circuits: securing hardware against probing attacks," 23rd Annual International Cryptology Conference, Aug. 2003, pp. 463-481.

Tarnovsky, "Security failures in secure devices," Black Hat Briefings, Feb. 2008, pp. 1-54.

"FreePDK45: Metal Layers," NCSU EDA Wiki, Dec. 2007, pp. 1-2, https://www.eda.ncsu.edu/wiki/FreePDK45:Metal_Layers.

Wu et al., "Focused helium ion beam deposited low resistivity cobalt metal lines with 10 nm resolution: implications for advanced circuit editing," Journal of Materials Science: Materials in Electronics, Oct. 2013, pp. 587-595, vol. 25.

Sidorkin et al., "Sub-10-nm nanolithography with a scanning helium beam," Journal of Vacuum Science & Technology B—Microelectronics and Nanometer Structures, Jul. 2009, pp. L18-L20, vol. 27, No. 4.

\* cited by examiner

LAYOUT-DRIVEN METHOD TO ASSESS VULNERABILITY OF ICS TO MICROPROBING ATTACKS

CROSS-REFERENCE TO RELATED APPLICATION

This application claims the benefit of U.S. Provisional Patent Application Ser. No. 62/433,532, filed Dec. 13, 2016, which is incorporated herein by reference in its entirety, including any figures, tables, and drawings.

STATEMENT OF GOVERNMENT SUPPORT

This invention was made with government support under grant number FA9550-14-1-0351 awarded by the United States Air Force/Air Force Office of Scientific Research (USAF/AFOSR). The government has certain rights in the invention.

BACKGROUND OF INVENTION

Microprobing is one kind of physical attack that directly probes at signal wires in order to extract sensitive information. Successful microprobing attacks have been reported on smartcards and microcontrollers in mobile devices. In a successful microprobing attack, plaintexts such as personal data, code format intellectual property (IP), or even encryption keys can be compromised. Most security critical Integrated Circuits (ICs) are reinforced against microprobing attacks with active shields to detect a breach and zero-ize sensitive information once a breach has been detected. However, major problems exist with this approach. Active shields are designed to cover the entirety of the die, and in some designs more than one metal routing layer is required. This puts a prohibitively high cost on the design, and leaves ICs fabricated with technologies offering a smaller number of available routing layers dangerously exposed to microprobing attacks. Furthermore, research has shown that using active shields in the top metal layer of an IC is very ineffective against microprobing attacks.

BRIEF SUMMARY

Embodiments of the subject invention provide novel and advantageous methods of assessing vulnerability of an Integrated Circuit (IC), including finding a milling exclusion area based on a covering wire and superimposing the found milling exclusion area onto rectangular segments of logic nets. Thus, vulnerability to microprobing attacks of fabricated integrated circuits can be quantitatively computed by utilizing layout information of the IC under scrutiny.

In an embodiment of the present invention, a method of assessing vulnerability of an Integrated Circuit (IC) can include: preparing a list of logic nets of the IC; obtaining rectangular segments from the logic nets; finding a milling exclusion area based on a covering wire; and superimposing the found milling exclusion area onto the rectangular segments of the logic nets.

In another embodiment of the present invention, a method of assessing vulnerability of an IC to microprobing attacks can include: identifying wire shapes of target wires of the IC; creating a bitmap canvas for the wire shapes of the target wires; finding intersecting wire shapes for the target wires; retrieving coordinates of the intersecting wire shape; computing mill-exclusion areas based on the coordinates of the intersection wire shape; projecting the mill-exclusion areas onto the bitmap canvas; and determining the existence and an area of an exposed area.

DETAILED DISCLOSURE

Embodiments of the subject invention provide novel and advantageous methods of assessing vulnerability of an Integrated Circuit (IC), including preparing a list of logic nets of the IC, obtaining rectangular segments from the logic nets, finding a milling exclusion area based on a covering wire, and superimposing the found milling exclusion area onto the rectangular segments of the logic nets.

Growing physical attacks have caused concerns for design of ICs for security-critical applications. Physical attacks circumvent encryption by attacking their silicon implementations. Microprobing is one kind of physical attack that directly probes at signal wires in order to extract sensitive information [1]. Successful microprobing attacks have been reported on smartcards and microcontrollers in mobile devices [15], [16]. In a successful microprobing attack, plaintexts such as personal data, code format intellectual property (IP), or even encryption keys can be compromised [2].

Most security critical ICs reinforced against microprobing attacks with active shield to detect a breach and zero-ize sensitive information once a breach has been detected. However, active shields are designed to cover the entirety of the die, and in some designs more than one metal routing layer is required. This puts a prohibitively high cost on the design, and leaves ICs fabricated with technologies offering a smaller number of available routing layers dangerously exposed to microprobing attacks. Research has shown using active shields in the top metal layer of an IC to be very ineffective against microprobing attacks [16].

Circuit microprobing refers to techniques that allow an attacker to directly observe partial or full sensitive information, e.g. plaintexts or encryption keys. ICs designed for security-critical applications such as smartcards, microcontrollers in mobile devices, and security tokens [15]-[17] are among the most common victims to this kind of attack. Many of these applications also have exploitable security weaknesses [17], probably due to tight budget margins. Examples include One-Time-Programmable (OTP) memories used to store configuration and passwords rewritable with Ultra-Violet (UV) light, password boot-strap-loader easy to circumvent, polysilicon fuses easy to read optically and easy to rewrite, and overly reused IPs that make exploits against them contagious. Some of these exploits might be possible to fix with better designs; however, the disparity between technology they use due to cost and the capabilities of milling instruments of a determined attacker make such a fix unlikely in the foreseeable future.

Figure 1:
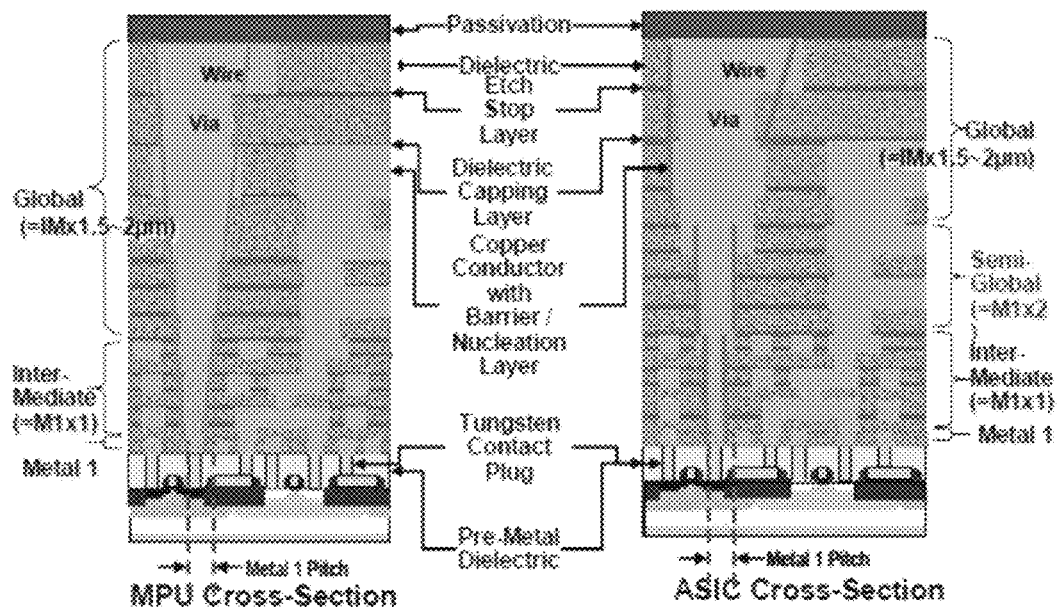
FIG. 1 shows cross-sectional views of a microprocessor (MPU) and an application specific integrated circuit (ASIC) [19].

Microprobing attacks are categorized as invasive attacks together with fault injection and circuit editing because they all require complete removal of the package and exposure of signal routing. Referring to FIG. 1, wires of targeted nets that the attacker wishes to reach are likely buried under multiple passivation, metal, and dielectric layers. On ICs fabricated with feature dimensions larger than 0.35 µm, laser cutters can be used to remove these layers. For technologies of lower dimensions, currently the most common and powerful tool is the Focused Ion Beam (FIB) [6]. With the help of a FIB, an attacker can mill with sub-micron or even nanometer level precision [21]. The most common method to protect IC from milling is the active shield, which places signal-carrying wires on top metal layers [8]-[12]. The expectation is that the milling will cut off at least one of these wires and trigger the payload, which usually consists of zero-izing the sensitive information. However, in addition to milling, FIB is also capable of depositing conducting traces [20], which adds circuit editing to the attacker's repertoire. This capability allows the attacker to completely disable the active shield by editing its control circuitry or payload, if it proves too difficult to bypass [15]. Nevertheless, bypassing is still preferable for the attacker as it saves time. The deciding factor to bypass the shield is the aspect ratio. Aspect ratio is a measure of the FIB performance defined as the ratio between milled hole depth and diameter [3]. FIB instruments with higher aspect ratio can be expected to mill a hole of smaller diameter, which will make bypassing an active shield easier. When milling in nanometer scale and applied on silicon ICs, state-of-the-art FIB systems can reach an aspect ratio up to 8.3 [4]. Another way to bypass the active shield is through back-side microprobing attacks [7], which probe at transistor activities from the silicon substrate (bottom layer in FIG. 1), rather than front-side which probes from passivation layers (top layer in FIG. 1) towards metal routing layers. This is facilitated by utilizing either the phenomenon of Photon Emission (PE) or Laser Voltage Techniques (LVX) [5]. Both techniques can observe current or voltage in transistor channels, thereby deducing logic values in that transistor. These microprobing attacks are very hard to defend against since conventional IC design processes don't place anything beneath the silicon substrate, and both methods being passive makes detection of such attacks quite difficult or even impossible. However, both methods require observation of photon emissions, which makes them limited by the wavelength of emitted photons. As technology advances and feature size shrinks, emissions from more devices will become indistinguishable, thus making microprobing attacks from the back-side difficult [5].

To protect against microprobing attacks, two categories of techniques can be used: techniques that stop microprobing; and techniques that make it impossible for information gained from microprobing to become useful to an unauthorized user.

Existing techniques designed to stop microprobing usually perform their duty by detecting and then zero-izing sensitive information. This can be achieved either by detecting the actual activity of microprobing or activities essential for microprobing to work. The more widely-studied and attempted approach is to detect hardware tampering by building a mesh of trigger wires to cover the design [8]-[12]. This is called an active shield, because the trigger wires are supposed to be constantly monitored in order to detect an attack. Some shield designs are analog: for example, capacitance measurement can be used to detect damage done to it, and thereby detect tampering [8]. The problem with analog shield designs is that analog sensors rely on parametric measurement, which has been shown to be weak [15]. Therefore, digital active shields can be used [10]-[12]. These methods send digital random vectors through the trigger wires, and check whether received vectors are altered. A milling through the mesh would be reliably detected when it cuts off at least one of the trigger wires. Possible prediction attack, where an attacker could predict the next random vector to be sent if the random vector generation is not secure enough, is another possibility [11]. A design where block ciphers in Cipher Block Chaining (CBC) mode generate secure random vectors can be used [11]. Layout routing of the active shield can be obfuscated so that the attacker would not be able to figure out how to perform a successful rerouting attack [12].

One problem with constructing an active shield is routing overhead. The act of microprobing can attempted to be detected by monitoring change of capacitance on security critical nets, as a cheaper alternative to the more popular active shield method as it requires far less area and routing overhead [13]. In addition to hardware-based approaches, one cryptographical method called t-private circuits [14] attempts to modify the security-critical circuit so that at least t+1 probes are required by an attacker to extract one bit of information.

Even though back-side attacks have been proposed, front-side attacks are still worth investigating due to photon wavelength limitation, and security critical designs may choose to fabricate a back-to-back 3D IC to avoid leaving back-side exposed [11]. Therefore, protection against front-side attacks remains important for antiprobing designs.

Among existing protection methods against front-side attacks, active shield remains the most-investigated method. However, no existing methods consider whether the top routing layers are the best place to detect breach. In fact, top routing layers are known to have much larger minimum wire widths [18], making it less protective than lower layers. This is especially true for devices such as smartcards, which are often fabricated with technology of larger dimensions such as 350 or 600 nm [16]. Another problem with the active shield method is at least an entire metal routing layer must be dedicated to the shield. This does not go well with designs with tight cost margins, or designs with few routing layers. Many ICs that will likely fall victim, such as smart-cards [16] or microcontrollers in distributed security applications [15], do not have a very wide cost margin nor many routing layers. Also, microprobing with FIB can escalate to circuit editing. It would also be unrealistic to assume that the attacker would stop at only extracting information, without injecting any of his own. A detect zero-ize approach that is difficult to bypass will likely encourage the attacker to disable it. In practice, FIB has been shown capable of this [15].

These problems suggest that there is no "magic bullet" in antiprobing designs. A more realistic approach is to create a framework to evaluate protection designs in terms of their performance against known exploits, and provide mathematical guidance in layout design so that vulnerabilities to microprobing can be reduced. Embodiments of the subject invention include: a layout-driven framework to assess designs against microprobing attacks considering known attacks and exploits; a mathematical analysis on bypassing shields with FIB at any angle; a verification algorithm based on a mainstream layout editor (Synopsys IC compiler) to quantitatively evaluate a post-place-and-route design in terms of exposed area vulnerable to microprobing by security-critical nets; and solutions to protection design issues with presented verification algorithm on OpenSPARC T1 core.

Figure 2:
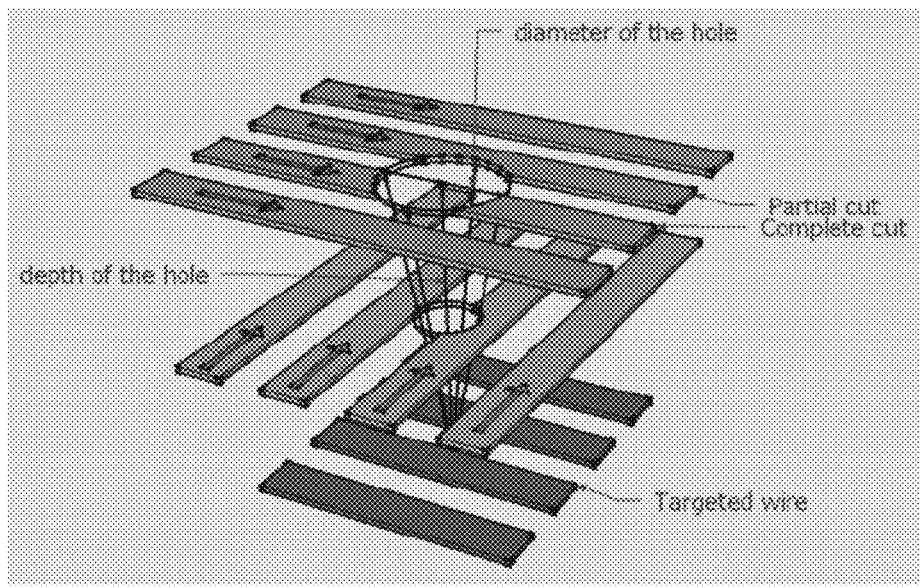
FIG. 2 shows a wire structure image on FIB-based milling.

In embodiments of the subject invention, a milling scenario can be considered using FIB technology as shown in FIG. 2, where colored bars are used to represent metal wires on different routing layers. For ease of reference to the figures only (not to be construed as limiting), it can be assumed that the lowest wires in the figure are on layer n, the green wires on layer n+p, the top wires on layer n+q, and the attacker wishes to probe at one of the wires on layer n to extract sensitive information. The hollowed-out cone shown in FIG. 2 represents a hole milled with FIB equipment. In reality, a milling hole for the purpose of microprobing would probably be larger for the probe tip to maintain a reliable connection, and FIG. 2 shows a best-case scenario for the attacker and worst-case scenario for the designer.

From a layout point of view, active shield designers are interested in the scenario where the attacker would make a mistake and completely cut off one metal wire at the purple layer, for the purpose of detecting the attacker with a difficult-to-mistake event. It is possible that a partially cut wire may be detected by its impact on circuit timing, similar to the analog shield idea [8]; However due to reliance on the aforementioned weakness due to reliance on parametric measurement, no digital active shields do this. Therefore, detection methods based on complete cuts only can be considered for illustrative purposes.

One known exploit on active shields is to create a reroute between identified equipotential points by circuit editing with FIB, so that the net would not become open when sections of the wires are removed [16]. This forces active shield designs to only use parallel wires of minimum spacing and widths [11]. In this case, the center of the hole least likely to result in a complete cut of a wire is in the center of the space between any two wires. Conversely, the designer need to ensure within $d_{\it eff}=2W+S$ the hole is at least as deep as $T=(A/R)W$, where W and S are shield-layer metal widths and minimum wire spacing, and (A/R) is the aspect ratio of the wire. This creates a restriction of milling hole diameter d on active shield layer $$d \leq d_{\it eff} + \frac{1}{R_{FIB}}T = 2W + S + \frac{W}{R_{FIB}} \quad (1)$$

must be satisfied or wires will be cut, where $R_{FIB}$ is the maximum aspect ratio of FIB. If we take W=S (as ITRS did [19]), Equation 1 further simplifies into $$d \leq \left(3 + \frac{1}{R_{FIB}}\right)W.$$

Figure 3:
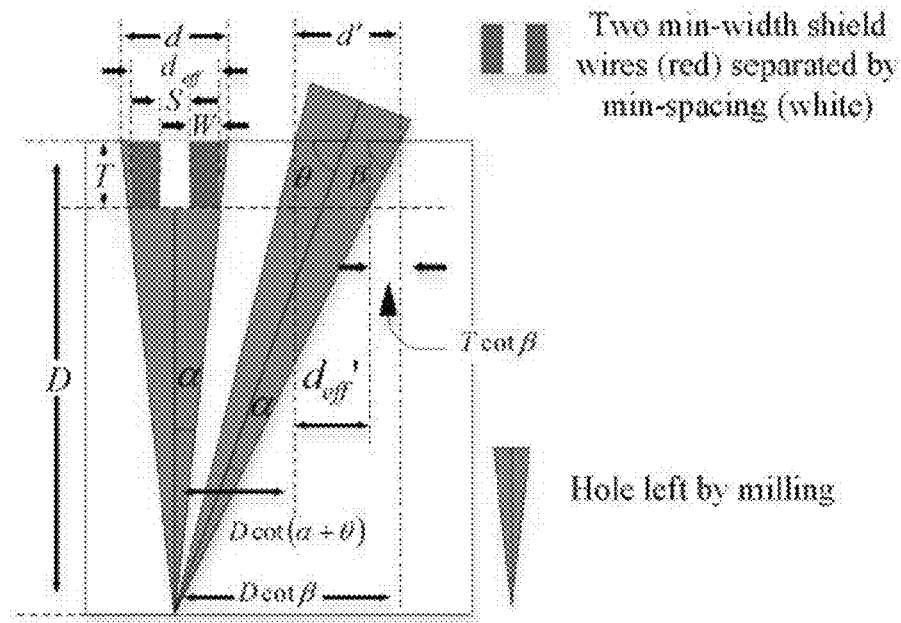
FIG. 3 shows a geometric calculation for non-perpendicular milling scenario.

One interesting question is whether the attacker would benefit if instead of milling vertically, he mills at an angle, as shown in FIG. 3. If it is assumed that the attacker was able to mill at $\theta \leq \frac{1}{2}\pi$, then the attacker will cut off wires within region $d'_{\it eff}$ instead of $d_{\it eff}$ $$d'_{\it eff} = d' - \begin{cases} T\cot\beta, & \theta \in \left[0, \frac{1}{2}\pi - \alpha\right] \\ T(\cot\beta - \cot(\theta + \alpha)), & \theta \in \left[\frac{1}{2}\pi - \alpha, \frac{1}{2}\pi\right] \end{cases} \quad (2)$$

$$= \frac{\sin 2\alpha}{\sin(\theta + \alpha)\sin(\theta - \alpha)}D -$$

$$\begin{cases} T\cot(\theta - \alpha), & \theta \in \left[0, \frac{1}{2}\pi - \alpha\right] \\ T(\cot(\theta - \alpha) - \cot(\theta + \alpha)), & \theta \in \left[\frac{1}{2}\pi - \alpha, \frac{1}{2}\pi\right] \end{cases}$$

Taking the derivative of $$\frac{d'{\it eff}}{d{\it eff}}$$

and letting it equal zero yields a minimum point at $$\theta_0 = \frac{1}{2}\mathrm{acos}\left(\frac{bc - \sqrt{b^2c^2 - (a^2+b^2)(c^2-a^2)}}{a^2+b^2}\right), \text{ where} \quad (3)$$

$a = (2(A/R)\tan\alpha + 6)\sin 2\alpha$ $b = 2(A/R)\tan\alpha\cos\alpha$ $c = 2(A/R)\tan\alpha$ If it is further assumed that (A/R)=2.5 as in [18] (ITRS uses 2.34 [19]), Equation 3 yields the following reduction in $d'_{\it eff}$ over $d_{\it eff}$ shown in Table I. From Table I, it can be seen that by milling at an angle of approximately 68°-69°, the attacker can effectively reduce the diameter of area by 8-12%, making it easier to bypass the shield. Because bypassing the shield is considered a convenient and preferable approach [15], this possibility makes FIB even more lethal for shields with wide top layer wires.

TABLE I

Maximum achievable reduction of $d_{\it eff}$ by milling at an angle.

| $R_{FIB}$ | 5 | 6 | 7 | 8 | 9 | 10 |
|---|---|---|---|---|---|---|
| $\frac{d'_{\it eff}}{d_{\it eff}}$ (%) | 92.12 | 90.58 | 89.47 | 88.63 | 87.98 | 87.45 |
| $\theta_0$ (°) | 68.93 | 68.69 | 68.52 | 68.38 | 68.28 | 68.19 |

Before presenting the framework to assess protection designs against microprobing attacks, it is essential to establish the principles of these designs. One pitfall for the designer might be to underestimate the capability of the attacker. When considering tools available to a microprobing attack, it is important to remember that attackers capable of nano-meter scale milling are not restricted to microprobing alone. FIB itself allows circuit editing, which enables attacker to disable the whole shield by tying its detection bit to ground. Lasers can be used to inject arbitrary values to confuse protective mechanism. Indeed, both techniques have been reported successful [15]. As a result, while designs that can defeat all known attacks might not be impossible, it is impractical to pursue for most devices.

Meanwhile, another pitfall is to underestimate the difficulty of a microprobing attack. It is important to remember that even if attackers are likely to find a way in, this does not mean protection design is futile. The goal of a microprobing attack is to obtain sensitive information, and sensitivity decays with time. Information expires, passwords are rotated, backdoors are fixed with security updates, and even functional designs are phased out of market by new generations. Therefore, if delayed long enough, objectives of even an attacker with infinite resources can be denied.

In addition to delaying the most well-equipped attackers, it is also in the interest of the designer to deter less well-equipped attackers. This is especially true for low-cost devices such as security tokens and smartcards. This deterrence can be performed in terms of capability or information. Countermeasures vulnerable to the most cutting-edge instruments might still filter out attackers that do not have access to such capabilities, and using custom designs instead of IPs reduce the risk of having vulnerability when an IP you use is successfully attacked.

In addition to the aforementioned principles, a protection design should always be assessed with knowledge of the attack it is designed to prevent. Published microprobing attacks [15] include these following fundamental steps, and each must be successful for the attack to succeed: reverse engineer a sacrificial device to get its layout and find target wires to microprobe; locate the target wires with a milling tool; reach the target wires without damaging target information; and extract target information. Each step can have a number of alternative techniques where success with only one of them is necessary. For example, locating target wires in layout can be done by reverse engineering the design or with information from a similar design. Obfuscation can force the attacker to spend more time on this step, but if the IP is reused in another design it would allow attacker to circumvent it.

Based on the principles discussed herein, embodiments of the subject invention can include a framework to assess a design for vulnerability to microprobing attacks. The protection against attackers with infinite resources can be represented with the sum of techniques with the lowest time cost from each necessary step, and the protection against less well-equipped attackers can be assessed by repeating the same process without techniques requiring unavailable capabilities.

In this framework it is possible for a particular microprobing technique to have an infinite time cost against a particular design, for example, an active shield with wires too thin for current FIB to bypass. However, the overall time cost is unlikely to be infinite due to existence of very powerful techniques such as circuit editing. In the aforementioned case, the attacker could opt to remove the shield and disable it by fault injection or circuit editing at shield control or payload circuitry, a technique known as disabling shield [15]. To better illustrate this, FIG. 4 shows an example of a diagram of known microprobing techniques [1], [15]-[17].

Figure 4:
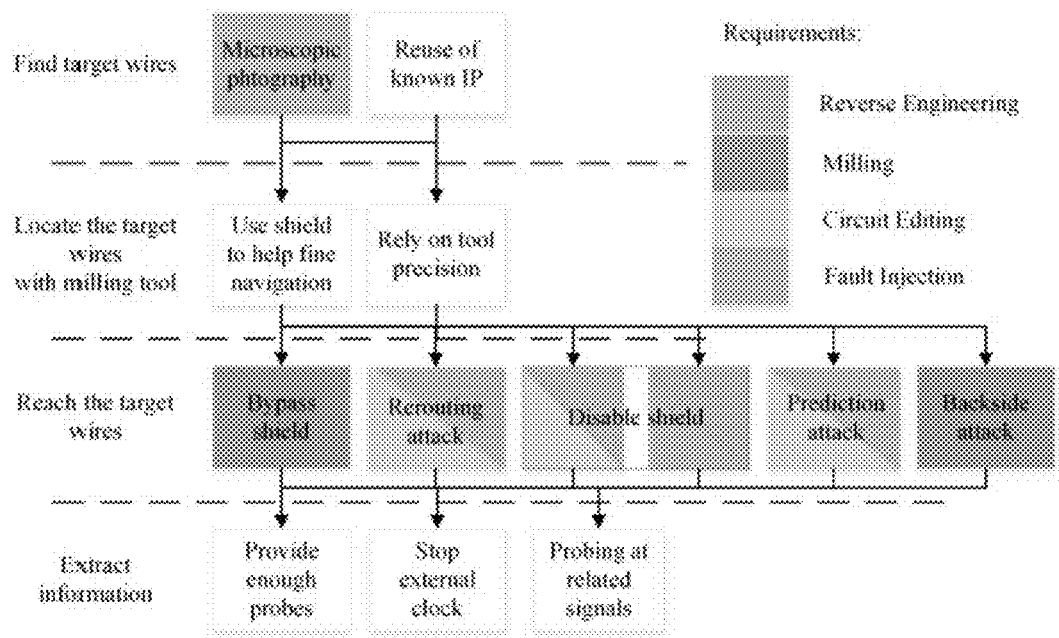
FIG. 4 shows a diagram of microprobing techniques for assessment of design vulnerability.

Referring to FIG. 4, a typical flow of a microprobing attack is shown, where each step is shown in a row and each block shows an alternative technique to complete that step. Some techniques are shaded with colors to represent the particular capability to enable that technique. Disable shield technique is shown with two blocks with blue triangles to show it can be completed either with circuit editing or fault injection, but in both options reverse engineering is required. Techniques in white boxes that do not have a colored alternative show possible exploits from avoidable design flaw rather than lack of protection. For example, "Use shield to help fine navigation" is possible if shield wires were not placed in 45° with regard to functional routing [15]; and if no internal clock source is used, an attacker could simply "stop external clock" to extract all information without having to use multiple probes. Based on these known microprobing techniques Table II shows an assessment of the protection of some designs. From the proposed framework, it can be seen that layout is of central importance in both restricting the attacker's options and increasing his time cost. If an area exposed to milling can be conveniently found, it will enable designers to create antiprobing designs with better all-around resilience. For this purpose, an algorithm can be used to evaluate and find exposed area.

In embodiments of the subject invention, the designer prepares a list of logic nets ("targeted nets") that might become victims to microprobing attacks, which can include, e.g., nets carrying signals critical to the function of the circuit and nets carrying signals from which security critical information can be easily deduced without breaking encryption. The rectangular segments that make up targeted nets, as well as those that make up wires that may deter microprobing attacks (e.g., wires on a higher layer, wires of antiprobing shields ("covering wires") are then obtained from a layout editor used to evaluate efficacy of microprobing attack deterrence as a result of covering wires. This can be done by finding an area into which a microprobing attack cannot succeed (a "milling exclusion area") without cutting off at least one segment of covering wires with a milling tool and therefore risking unfavorable outcomes that may prevent or inhibit unauthorized access of security critical information by said microprobing attack, due to for example detection by an antiprobing shield or destruction of security critical information by severing key logic nets responsible for its generation. The milling exclusion area can be found by first finding a milling exclusion area due to one rectangular segment of covering wire affecting one rectangular segment of a targeted net considering their respective routing layer, technology information (e.g., layer thickness and minimum wire width and spacing), and assumed technological capability of milling instruments employed by microprobing attackers (e.g., aspect ratio and attack angles). The milling exclusion area of each targeted net can then be found by iterating through each rectangular segment of targeted nets and finding a milling exclusion area of each rectangular segment of each covering wire that may affect that segment of targeted net, and then superimposing all milling exclusion areas onto the original targeted net segment to find an overall milling exclusion area and an exposed area. That is, evaluation of vulnerability to microprobing attacks is performed quantitatively, and the layout information is taken into consideration for the evaluation. Embodiments of the subject invention can advantageously perform evaluation of vulnerability to microprobing attacks quantitatively, as well as take layout information into consideration for such evaluation.

TABLE II

Performance against known microprobing techniques of published designs

| | | | Protection against | | |
| --- | --- | --- | --- | --- | --- |
| Designs | Bypass Shield | Rerouting Attack | Disable Shield Backside Attack | Prediction Attack | Related Signals |
| Analog Shield | Weak [15] | No | No | N/A | Yes |
| Random | Yes | Yes | No | No | Yes |

TABLE II-continued

Performance against known microprobing techniques of published designs

| | Protection against | | | | |
|---|---|---|---|---|---|
| Designs | Bypass Shield | Rerouting Attack | Disable Shield Backside Attack | Prediction Attack | Related Signals |
| Active Shield [12] | | | | | |
| Cryptographically Secure Shield [11] | Yes | Yes | No | Yes | Yes |
| PAD [13] | N/A | N/A | No | N/A | No |

Embodiments of the subject invention can aid in developing and evaluating security systems to prevent or inhibit microprobing attacks of integrated circuits used in security critical applications, such as smartcards, security tokens, and secured microprocessors in mobile devices.

Embodiments of the subject invention enable objective and quantitative evaluation of security and efficacy of any system developed to thwart microprobing attacks. By requesting quantified assumption on level of capability of the presumed attacker, embodiments provide a quantified metric of security for all systems evaluated, so that a realistic management on level of security is made possible. In broader terms, embodiments improve efficiency and accuracy of antiprobing systems while providing a way to manage risks of microprobing attacks.

Referring to FIG. 2, an active shield will need a complete cut to detect milling, and a complete cut will happen if the center of milling exists within $d_{faredge}$ from the far edge of the wire, where $$d_{faredge} = \frac{D-H}{2R_{FIB}} \quad (4)$$

where D is the depth of the hole, H is the thickness of the intersecting wire, and $R_{aspect\,ratio}$ (or $R_{FIB}$) is the aspect ratio given by the FIB technology the attacker is using. The aspect ratio represents the best FIB the shield will be able to defend against.

Equation 4 shows that is possible to find the area that the milling center should not fall inside. This area can be referred to as the milling-exclusion area. The desired exposed area can be its complement. FIG. 5 shows how this area can be found for any given target wire and a wire on a higher layer capable of projecting this milling-exclusion area for it ("intersecting wire"), assuming both are rectangular.

Figure 5A:
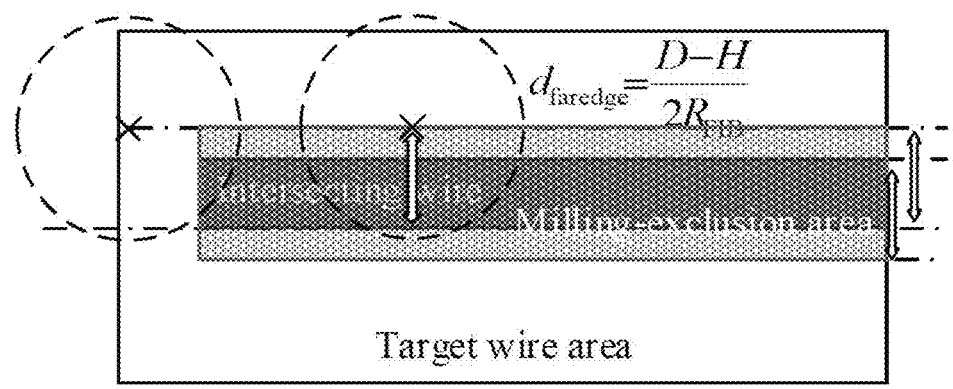
FIG. 5(a) shows a milling-exclusion area on sides of intersecting wire.
Figure 5B:
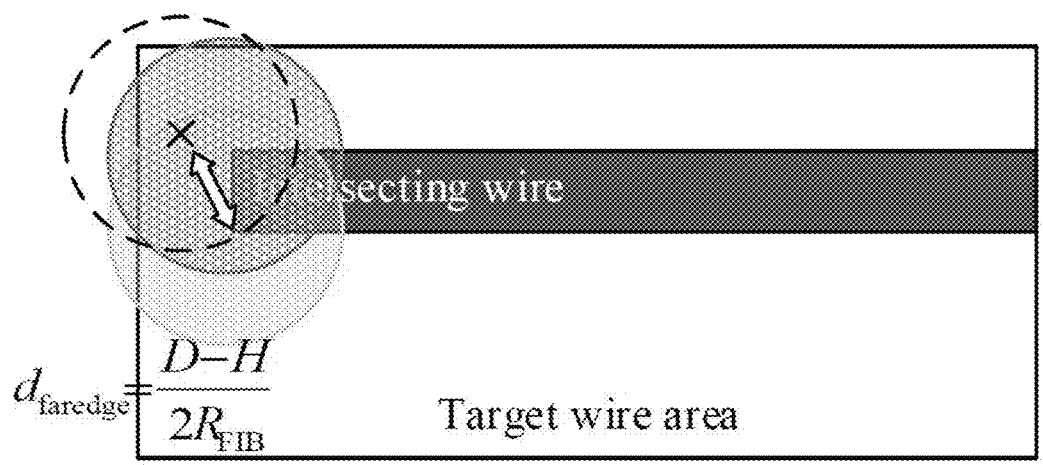
FIG. 5(b) shows a milling-exclusion area on ends of intersecting wire.

Boundaries of the milling-exclusion area can be found in two possible cases for a rectangular intersecting wire: the boundaries on the sides of the intersecting wire, and at both ends. The first kind is quite intuitive. Referring to FIG. 5(a), the center of the milling cannot fall within $d_{faredge}$ from the farther edge of the intersecting wire, so boundaries of the first kind are two straight lines, each $d_{faredge}$ away from the farther edge. The other kind of boundaries on ends is a bit more complex. Referring to FIG. 5(b), the milling hole is marked by the dotted circle. For it to precisely cut off the intersecting wire at each corner of the intersecting wire, its center must be on the edge of another circle centered at that corner, with same radius as itself. Any point within that other circle will still cut off that corner, although not necessarily the other corner. Therefore, the intersection area of both at both corners at an end constitute the complete set of at both corners at an end constitute the complete set of milling center locations that will guarantee cut of both corners, i.e., a complete cut. Consequently, any intersecting wire rectangular in shape will project a milling-exclusion area whose shape is the union of the shape shown in FIG. 5(a) and FIG. 5(b).

Wires in layout designs are seldom rectangular, but they often include a number of rectangular wires, usually called shapes by layout design tools. By iterating through each of these constituent rectangular wires, mill-exclusion areas from each intersecting wire can be projected onto each wire that may carry sensitive information and become a target of a microprobing attack. This process is elaborated in the pseudocode as shown in Algorithm 1.

Figure 6A:
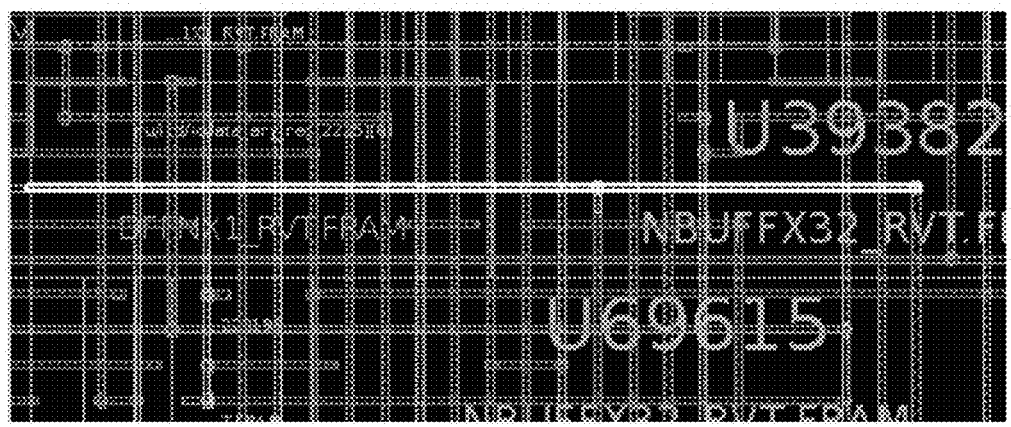
FIG. 6(a) shows a targeted wire in a layout.
Figure 6B:
FIG. 6(b) shows a milling-exclusion area projected on a canvas of the same wire.

As shown in Algorithm 1, the methodology of embodiments of the subject invention starts with a set of logic nets. The algorithm first identifies their constituting wire shapes in targeted wire shapes. For each targeted wire shape, a bitmap canvas is created, onto which mill-exclusion areas are to be projected once found. These coordinates are also given to the layout design tool to find intersecting wire shapes on each layer above. For each layer, a different $d_{faredge}$ is calculated, which is then used for projections from all intersecting wire shapes on that layer. Coordinates of each intersecting wire shape are also retrieved to compute its mill-exclusion area, which is then projected to the aforementioned canvas, as shown in FIG. 6. Projection is done by locating ends and sides of each intersecting wire shape and printing the corresponding projected mill-exclusion areas. After all mill-exclusion areas are projected, running the resulting script—draw.script—can easily determine the existence and area of an exposed area.

For processing efficiency and adaptability, both canvas creation and projection steps can be stored by the layout design tool part of the algorithm, for example in the format of MATLAB scripts. Considerations of microprobing attacks at non-perpendicular angles can also be included with simple modifications with trigonometric functions. Another possible concern is the precision of the bitmap method. The algorithm rounds toward minus infinity on borders, i.e., errs towards false positive. However, because mill-exclusion areas are convex, overlapping of mill-exclusion areas is also unlikely to cause the algorithm to declare a vulnerable point when there is none.

ALGORITHM 1

Proposed locator algorithm for exposed area.

Input: targeted_nets, precision, all_layers
Output: draw.script
1 begin
2    targeted_wire_shapes ⇐ get_net_shapes(targeted_nets)
3    N ⇐ sizeof_collection(targeted_wire_shapes)
4    for (i = 1 : N) do ALGORITHM 1-continued Proposed locator algorithm for exposed area.

```
 5  |       | targeted_wire_shape ⇐ targeted_wire_shapes(i)
 6  |       | canvas_size ⇐ get_sizes(get_bounding_box(targeted_wire_shape))*precision
 7  |       | Print command in draw.script to create canvas in draw.script whose size equals to canvas_size
 8  |       | layers_above ⇐ get_layers_above(all_layers, get_layerof(targeted_wire_shape))
 9  |       | M ⇐ sizeof_collection(layers_above)
10  |       | for (j = 1 : M) do
11  |       |    | this_layer ⇐ layers_above(j)
12  |       |    |
```
$$d\_faredge\_on\_thislayer \Leftarrow \frac{D - H}{2^R \text{FIB}}$$
```
13  |       |    | intersecting_wire_shapes ⇐ get_net_shapes(targeted_nets) in
    |       |    | get_bounding_box(targeted_wire_shape) on this_layer
14  |       |    | L ⇐ sizeof_collection(intersecting_wire_shapes)
15  |       |    | for (k = 1 : L) do
16  |       |    |    | intersecting_wire_shape ⇐ intersecting_wire_shapes(k)
17  |       |    |    | Print command in draw.script to create projection in draw.script whose radius/widths
    |       |    |    | equals to d_faredge_on_thislayer
18  |       |    | end
19  |       | end
20  |    end
21  end
```

The algorithms of embodiments of the subject invention provide the first quantifiable way to verify and evaluate microprobing vulnerabilities. This will open up a number of new opportunities in protection designs. With algorithms of embodiments of the subject invention, active shield no longer needs to cover an entire layer to ensure security; therefore, it can be relocated to better-performing layers to improve the FIB aspect ratio it can protect against. Weak links in the design, such as control and payload wires, could be buried with functional signal routes and made more resilient to attacks. Covering with multiple signal routes leads to greatly elevated requirement of reverse engineering and consequently time cost for the attacker, since he has to ensure the information gained is unspoiled and has no way to verify it. This approach is also beneficial if used in conjunction with anti-reverse engineering designs, as the latter greatly increase time cost in reverse engineering. This can also allow protection to designs too tight in cost margin or number of layers to afford an entire layer for active shield. For this purpose, more layout-based tools can be developed to identify security critical nets, find functional nets most suitable to serve as intersecting wire shapes, and exploit faster microprobing assessment metrics that can integrate into existing layout optimization flow.

While existing methods to reinforce IC in security critical applications against microprobing attacks under active research interest are plagued with high cost, weaknesses that could be exploited by attackers, and incompatibility to technologies with few layers, embodiments of the subject invention provide a layout-driven framework to assess designs for vulnerabilities to microprobing attacks. Based on design principles and assessment metrics that have been established, embodiments of the subject invention provide algorithms to analyze layout designs for potential vulnerabilities to microprobing attacks. The performance on the layout of an OpenSPARC T1 core is discussed in Example 1 below, and evaluation shows the potential to process a large amount of nets with a practical time cost.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as Random Access Memories (RAM, DRAM, SRAM); and non-volatile memory such as flash memory, various Read-Only-Memory (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a Compact Disc (CD), Digital Video Disc (DVD), flash memory device, volatile memory, or a Hard Disk Drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1 A method of assessing vulnerability of an Integrated Circuit (IC), the method comprising:

preparing a list of logic nets of the IC;

obtaining rectangular segments from the logic nets;

finding a milling exclusion area based on a covering wire; and superimposing the found milling exclusion area onto the rectangular segments of the logic nets.

Embodiment 2 The method according to embodiment 1, wherein the logic nets are targeted nets.

Embodiment 3 The method according to any of embodiments 2-3, wherein the rectangular segments are obtained from a layout editor.

Embodiment 4 The method according to any of embodiments 1-3, wherein the milling exclusion area is an area where a microprobing attack cannot succeed without cutting off at least one of the rectangular segments.

Embodiment 5 The method according to any of embodiments 1-4, wherein finding the milling exclusion area is determined by a width and a space of the covering wire.

Embodiment 6 A method of assessing vulnerability of an IC to microprobing attacks, the method comprising:
identifying wire shapes of target wires of the IC;
creating a bitmap canvas for the wire shapes of the target wires;
finding intersecting wire shapes for the target wires;
retrieving coordinates of the intersecting wire shape;
computing mill-exclusion areas based on the coordinates of the intersection wire shape;
projecting the mill-exclusion areas onto the bitmap canvas; and
determining existence and an area of an exposed area.

Embodiment 7 The method according to embodiment 6, wherein the exposed area is a complement of the mill-exclusion areas.

Embodiment 8 The method according to any of embodiments 6-7, wherein finding intersecting wire shapes includes giving coordinates of the target wires to a layout design tool.

Embodiment 9 The method according to any of embodiments 6-8, further comprising calculating a hole diameter that is configured to be used for projecting.

Embodiment 10 The method according to embodiment 9, wherein the hole diameter $d_{faredge}$ is expressed as the following Formula 1

$$d_{faredge} = \frac{D-H}{2R_{FIB}} \quad \text{Formula 1}$$

where D is a depth of a hole, H is a thickness of the intersecting wire, and RFIB is an aspect ratio given by a Focused Ion Beam (FIB).

Embodiment 11 The method according to any of embodiments 6-10, wherein projecting the mill-exclusion areas is performed by locating ends and sides of the intersecting wire shape and printing the corresponding projected mill-exclusion areas.

Embodiment 12 The method according to embodiment 8, wherein the created bitmap canvas is stored by the layout design tool.

Embodiment 13 The method according to embodiment 8, wherein the projected mill-exclusion areas are stored by the layout design tool.

Embodiment 14 A method of finding a milling-exclusion area, the method comprising:
preparing a target wire;
finding an intersecting wire on a higher layer capable of projecting the milling-exclusion area;
calculating a hole diameter dfaredge expressed as the following Formula 2

$$d_{faredge} = \frac{D-H}{2R_{FIB}} \quad \text{Formula 2}$$

where D is a depth of a hole, H is a thickness of the intersecting wire, and $R_{FIB}$ is an aspect ratio given by a Focused Ion Beam (FIB); and
determining the milling-exclusion area based on the calculated hole diameter.

Embodiment 15 The method according to embodiment 14, wherein the milling-exclusion area is an area inside which a milling center does not fall.

Embodiment 16 The method according to any of embodiments 14-15, wherein the intersecting wire has a rectangular shape.

Embodiment 17 The method according to any of embodiments 14-16, wherein the milling-exclusion area includes side boundaries calculating the hole diameter dfaredge from a farther edge of the intersecting wire.

Embodiment 18 The method according to any of embodiments 14-17, wherein the milling-exclusion area includes an end boundary calculating the hole diameter dfaredge from a corner of the intersecting wire.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

Valuation Results

The algorithm disclosed herein was evaluated for an actual chip design. The objective was to find out how efficient the algorithm can be and how much area in a typical unprotected design is exposed to microprobing attacks. For this purpose, layout of an OpenSPARC T1 core using Synopsys SAED 32 nm technology library was chosen for the algorithm to inspect. For the purpose of verification, two groups of nets were selected to serve as targeted wires: first, long wires were looked for in the design, and then wires on lower layers were evaluated. Long wires were chosen for their resemblance to data buses, which are typical targets for microprobing attacks. Wires routed in lower layers were less exposed than wires routed in higher layers and therefore forcing nets that could carry security-critical information to route on lower layers can be a sensible alternative to active shield. For this evaluation a resolution of 10 nm was used, and the maximum $R_{FIB}=10$ was assumed.

The long wires in this evaluation were picked based on the diagonal length of the smallest rectangle encompassing all of its shapes. All long wires thus picked have a diagonal length of at least 500 µm, a number chosen to be longer than 99% of all signal route nets. On the other hand, nets routed on lower layers were restricted to not have shapes on layers higher than metal-4. This layer was picked because it is a likely destination layer if the designer tries to push his more vulnerable nets into lower layers. 5000 nets in lower-layer group of nets and 128 nets in long-wire group of nets were investigated. Their running time and exposed area are shown in Table III.

TABLE III

Evaluation results on long nets and nets on low layers

| Performance | Nets on Metal-4 or Lower Layers | Lone Nets |
| --- | --- | --- |
| Total Number of Nets | 5000 | 128 |
| Total Processing Time (s) | 27145 | 11708 |
| Processing Time per Unit Area (s/μm$^2$) | 5.1242 | 2.1207 |
| Total Area (μm$^2$) | 5320.58 | 5497.66 |
| Exposed Area (μm$^2$) | 4339.84 | 4869.21 |

In both cases, the algorithm was able to finish processing within a few hours for a few thousand μm$^2$. the speed could be further improved, but it is acceptable for practical purposes, especially if it is considered that the number of probes an attacker can simultaneously support is also restricted. Despite only having 128 nets, a much smaller number compared to 5000 nets in lower-layer group, the long-wire nets almost have the same total area. It shows a greatly reduced difficulty for the attacker to attempt microprobing at these long wires than at wires carrying signals related to it but otherwise much shorter and on lower layers. This could suggest that having those related signals might not be as bad as it first appeared. Indeed, judging from the difference in percentage of exposed area between the two groups of nets (81.57% in lower-layer group, 88.57% in long-wire group), long wires are more exposed than wires on lower layers.

This evaluation investigated the protection performance of active shield against FIB-based microprobing attack. Using the same layout, in this evaluation it was assumed that on the topmost MRDL layer, horizontal active shield wires were present. Wire width and wire spacing of this shield were both assumed to equal to 2 μm as was given by minimum wire width and minimum spacing of that layer in the technology file. The targeted nets were the same nets as the group of long nets above. Results are given in Table IV. In Table IV, the row "shield ineffective" indicates how many wire shapes among the total cannot benefit from the coverage of the shield at all. This is based on the number of shapes without regard to their area, and over 80% of these shapes are below metal layer 4. From the results it can be seen that even on very low $R_{FIB}$, the long wires were not benefiting much from the shield. This result substantiated the previous observation that current entire-layer active shields are restricted by very wide top layer metal wire width since they cannot be placed on lower layers without making all layers above it unavailable to the design. Compared to the results in Table III, it makes sense to try using functional signal routes instead.

TABLE IV

Evaluation of active shield performance

| Performance | $R_{FIB}$ | | | | | |
| --- | --- | --- | --- | --- | --- | --- |
|  | 5 | 6 | 7 | 8 | 9 | 10 |
| % shield ineffective (%) | 1.52 | 3.82 | 19.50 | 45.90 | 100 | 100 |
| Exposed Area (μm$^2$) | 4364.63 | 4507.47 | 4656.88 | 4760.98 | 4869.21 | 4869.21 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

REFERENCES

[1] Skorobogatov, S., "Physical attacks on tamper resistance: progress and lessons," Proc. of 2nd ARO Special Workshop on Hardware Assurance, Washington, D.C., 2011

[2] Anderson, R., "Security engineering: A guide to building dependable distributed systems," Wiley, 2001

[3] Fu, Y.; Ngoi, K. A. B., "Investigation of aspect ratio of hole drilling from micro to nanoscale via focused ion beam fine milling," 2005

[4] Wu, H.; Ferranti, D.; Stern, L., "Precise nanofabrication with multiple ion beams for advanced circuit edit," in Microelectronics Reliability, vol. 54, iss. 910, pp. 1779-1784, September-October 2014

[5] Boit, C.; Helfmeier, C.; Kerst, U., "Security Risks Posed by Modern IC Debug and Diagnosis Tools," in Fault Diagnosis and Tolerance in Cryptography (FDTC), 2013 Workshop on, IEEE, pp. 3-11, August 2013

[6] Quadir, S. E.; Chen, J.; Forte, D.; Asadizanjani, N.; Shahbazmohamadi, S.; Wang, L.; Chandy, J.; Tehranipoor, M., "A Survey on Chip to System Reverse Engineering," to appear ACM Journal on Emerging Technologies in Computing Systems (JETC).

[7] Helfmeier, C.; Nedospasov, D.; Tarnovsky, C.; Krissler, J. S.; Boit, C.; Seifert, J. P., "Breaking and entering through the silicon," in Proceedings of the 2013 ACM SIGSAC conference on Computer & communications security, pp. 733-744, ACM, November 2013

[8] Laackmann, P.; Taddiken, H., "Apparatus for protecting an integrated circuit formed in a substrate and method for protecting the circuit against reverse engineering," U.S. Pat. No. 6,798,234. 28 Sep. 2004

[9] Ling, M.; Wu, L.; Li, X.; Zhang, X.; Hou, J.; Wang, Y., "Design of Monitor and Protect Circuits against FIB Attack on Chip Security," in Computational Intelligence and Security (CIS), 2012 Eighth International Conference on, pp. 530-533, 17-18 Nov. 2012

[10] Beit-Grogger, A.; Riegebauer, J., "Integrated circuit having an active shield," U.S. Pat. No. 6,962,294. 8 Nov. 2005

[11] Cioranesco, J.-M.; Danger, J.-L.; Graba, T.; Guilley, S.; Mathieu, Y.; Naccache, D.; Xuan Thuy Ngo, "Cryptographically secure shields," in Hardware-Oriented Security and Trust (HOST), 2014 IEEE International Symposium on, vol., no., pp. 25-31, 6-7 May 2014

[12] Briais, S.; Cioranesco, J.-M.; Danger, J.-L.; Guilley, S.; Naccache, D.; Porteboeuf, T., "Random Active Shield," in Fault Diagnosis and Tolerance in Cryptography (FDTC), 2012 Workshop on, pp. 103-113, 9-9 Sep. 2012

[13] Manich, S.; Wamser, M. S.; Sigl, G., "Detection of probing attempts in secure ICs," in Hardware-Oriented Security and Trust (HOST), 2012 IEEE International Symposium on, pp. 134-139, 3-4 Jun. 2012

[14] Ishai, Y.; Sahai, A.; Wagner, D., "Private circuits: Securing hard-ware against probing attacks," Advances in Cryptology-CRYPTO 2003. Springer Berlin Heidelberg, 2003. 463-481.

[15] Ray V., "FREUD Applications of FIB: Invasive FIB Attacks and Counter-measures in Hardware Security Devices", East-Coast Focused Ion Beam User Group Meeting, February 2009

[16] Tarnovsky C., "Tarnovsky Deconstruct Processor," Youtube, 2013.

[17] Tarnovsky C., "Security Failures In Secure Devices", Black Hat Briefings, February 2008

[18] FreePDK45: Metal Layers.

[19] International Technology Roadmap for Semiconductors 2013 Edition.

[20] Wu, H.; L. Stern; D. Xia; D. Ferranti; B. Thompson; K. Klein; C. Gonzalez; P. Rack, "Focused Helium Ion Beam Deposited Low Resistivity Cobalt Metal Lines with 10 nm Resolution: Implications for Advanced Circuit Editing," Journal of Materials Science: Materials in Electronics 25 (2): 587-595, 2014

[21] Sidorkin, V.; van Veldhoven, E.; van der Drift, E.; Alkemade, P.; Salemink, H.; Maas, D., "Sub-10-nm nanolithography with a scanning helium beam," Journal of Vacuum Science & Technology B, 27, L18-L20, 2009

What is claimed is:

1. A method of assessing vulnerability of an Integrated Circuit (IC), the method comprising:
    preparing a list of logic nets of the IC;
    obtaining rectangular segments from the logic nets;
    finding a milling exclusion area based on a covering wire of one of the rectangular segments of the logic nets, wherein the milling exclusion area comprises an area where a microprobing attack cannot succeed without cutting off the covering wire, and wherein the milling exclusion area is determined based at least in part on a dimension of the covering wire; and
    superimposing the found milling exclusion area onto the rectangular segments of the logic nets.

2. The method according to claim 1, wherein the logic nets are targeted nets.

3. The method according to claim 2, wherein the rectangular segments are obtained from a layout editor.

4. The method according to claim 3, wherein finding the milling exclusion area is determined by a width and a space of the covering wire.

5. The method according to claim 1, wherein finding the milling exclusion area is performed by iterating through each of the rectangular segments.

6. The method according to claim 5, further comprising determining an area of an exposed area that is a complement of the milling exclusion area.

7. A method of assessing vulnerability of an IC to microprobing attacks, the method comprising:
    identifying wire shapes of target wires of the IC;
    creating a bitmap canvas for the wire shapes of the target wires;
    finding an intersecting wire shape for the target wires;
    retrieving coordinates of the intersecting wire shape;
    computing mill-exclusion areas based on the coordinates of the intersecting wire shape, wherein the mill-exclusion areas are areas where the microprobing attacks cannot succeed without cutting off the intersecting wire, and wherein the mill-exclusion areas are determined based at least in part on a dimension of the intersecting wire shape;
    projecting the mill-exclusion areas onto the bitmap canvas; and
    determining existence and an area of an exposed area.

8. The method according to claim 7, wherein the exposed area is a complement of the mill-exclusion areas.

9. The method according to claim 8, wherein finding the intersecting wire shape includes giving coordinates of the target wires to a layout design tool.

10. The method according to claim 9, further comprising calculating a hole radius that is configured to be used for projecting.

11. The method according to claim 10, wherein the hole radius $d_{faredge}$ is expressed according to the following Formula 1

$$d_{faredge} = \frac{D-H}{2R_{FIB}}$$

where D is a depth of a hole, H is a thickness of the intersecting wire, and $R_{FIB}$ is an aspect ratio given by a Focused Ion Beam (FIB).

12. The method according to claim 10, wherein projecting the mill-exclusion areas is performed by locating ends and sides of the intersecting wire shape and printing the corresponding projected mill-exclusion areas.

13. The method according to claim 9, wherein the created bitmap canvas is stored by the layout design tool.

14. The method according to claim 9, wherein the projected mill-exclusion areas are stored by the layout design tool.

15. A method of finding a milling-exclusion area, the method comprising:
    preparing a target wire;
    finding an intersecting wire on a higher layer capable of projecting the milling-exclusion area;
    calculating a hole radius $d_{faredge}$ expressed according to the following Formula 2

$$d_{faredge} = \frac{D-H}{2R_{FIB}}$$

where D is a depth of the hole, H is a thickness of the intersecting wire, and $R_{FIB}$ is an aspect ratio given by a Focused Ion Beam (FIB); and
    determining the milling-exclusion area based on the calculated hole radius $d_{faredge}$, wherein the mill-exclusion area is an area where the Focused Ion Beam cannot mill the hole with the depth D without cutting off the intersecting wire.

16. The method according to claim 15, wherein the milling-exclusion area is an area that a milling center does not fall inside.

17. The method according to claim 16, wherein the intersecting wire has a rectangular shape.

18. The method according to claim 17, wherein the milling-exclusion area includes side boundaries that are each the hole radius $d_{faredge}$ away from a farther edge of the intersecting wire.

19. The method according to claim 17, wherein the milling-exclusion area includes an end boundary that is the hole radius $d_{faredge}$ away from a corner of the intersecting wire.

* * * * *